United States Patent [19]
Shaffer et al.

[11] Patent Number: 5,825,858
[45] Date of Patent: Oct. 20, 1998

[54] COLLABORATIVE CONFERENCE BRIDGES

[75] Inventors: Shmuel Shaffer, Palo Alto; Neufito Fernandes, Cupertino, both of Calif.

[73] Assignee: Siemens Business Communication Systems, Inc., Santa Clara, Calif.

[21] Appl. No.: 646,754

[22] Filed: May 1, 1996

[51] Int. Cl.$^6$ .................................................. H04M 15/00
[52] U.S. Cl. ........................ 379/120; 379/112; 379/114; 379/125; 379/140; 379/202
[58] Field of Search ............... 379/112–114, 202, 379/204–207, 220, 221, 299, 131, 67, 58, 91, 62, 120, 125, 198, 231, 234, 225, 128, 201, 219, 115, 229, 243, 232, 233, 9, 10, 15, 33

[56] References Cited

U.S. PATENT DOCUMENTS

| | | | |
|---|---|---|---|
| 4,340,960 | 7/1982 | Moran | 370/62 |
| 5,027,387 | 6/1991 | Moll | 379/112 |
| 5,408,526 | 4/1995 | McFarland et al. | 379/202 |
| 5,617,471 | 4/1997 | Rogers et al. | 379/115 |
| 5,631,904 | 5/1997 | Fitser et al. | 379/118 |

*Primary Examiner*—Paul Lomas
*Assistant Examiner*—Binh K. Tieu

[57] ABSTRACT

A method and apparatus for executing a conference call session between parties provides collaboration between nodes having separate conference-bridging capabilities, so that selection from a number of alternative connectivity schemes can be based upon bridge-to-bridge negotiation. The selection of a connectivity scheme may be based upon one or more of cost and telecommunication resource availability. Selection may also be based upon stored historical data relating to prior conference calls involving at least one of said parties and/or upon historical data of patterns of node resource availability. A conference bridge includes a user interface, a message interface, a connectivity computation component, a conference bridge manager, and a multimedia exchange component. An input to the connectivity computation component includes a database having tariff table information and resource-demand cycle information. Another input to this component is a load monitor for continuously determining the availability of telecommunication resources. In the preferred embodiment, the method and apparatus allow dynamic reconfiguration of conference call connectivity when a time-dependent condition or a load-dependent condition is detected.

27 Claims, 5 Drawing Sheets

COLLABORATIVE CONFERENCE BRIDGES

TECHNICAL FIELD

The invention relates generally to conference calls and more particularly to methods and apparatus for establishing bridges among the participants of a conference call.

DESCRIPTION OF THE RELATED ART

Conference calls permit each of three or more parties at different telecommunications stations to communicate with all of the other parties of the call. Each station may merely be a telephone or may include equipment for allowing multimedia transmissions.

Conventional conference calls are manually set up. A calling party dials the other parties of the call, places them on "hold," and patches them together by releasing the holds simultaneously. While some systems use different patching techniques, human involvement traditionally has determined how connections are made among the parties (i.e., "connectivity"). If two persons of an ongoing call session decide to add a third person to form a conference call session, the original parties determine which one is to initiate the connection to the third party. However, the parties may not have sufficient information to decide the optimal call routing.

While this conventional approach requires significant user intervention in selecting among possible connections, electrical connectivity for conference call sessions is established using conference bridges. A conference bridge is a telephony device that mixes multimedia information from different telecommunications stations to provide a multiple party call session. The conference bridge includes a message-transmitting level for exchanging transmissions with other switches and includes a voice-path level for exchanging voice data and/or other multimedia data among the telephone/multimedia stations at which the call participants are located. Each switch ("node") in a public or private network of switches may have a separate conference bridge to provide independent conference-bridging capability to the switch. However, there may be a central conference bridge that provides this capability to an entire network.

There are a number of factors that determine the "optimal" routing for establishing a conference call session. For example, cost plays a role in the determination of the optimal connectivity of the parties. If there are three parties that must be connected and two of the parties are subscribers of a single switch, typically the preferred connectivity is one in which the conference bridge of the shared switch links the parties. If the parties are all subscribers of different switches, typically the preferred switch for bridging the parties is the one that can establish the connectivity most inexpensively. However, there are other factors that sometimes override cost. If the telecommunications resources, such as the trunk lines, of a particular switch are already heavily taxed by ongoing conference and/or other call sessions, the optimal connectivity of the parties may be one that requires greater involvement by one of the more expensive routing selections. Another concern is that certain switches may provide a greater quality of service for multimedia communications in conference calls, so that quality-of-service capabilities play a role in determining the optimal connectivity.

The parties of a conference call may not be concerned about the optimal connectivity, and are typically not in a position to consider all of the factors. Often, call rates will vary with the time of the day. If different switches are in different time zones, the less expensive switch to connect the parties may depend upon the time of day. U.S. Pat. No. 5,408,526 to McFarland et al. describes an automated conference calling system. The conference optimization system (COS) may be part of a public telecommunications network and/or part of a global private telecommunications network. The COS is located so that it can be accessed by a subscriber of any one of the switches in a network of switches. Thus, when a party who is a subscriber to one of the various switches contemplates initiating a conference call, the initiator dials a direct access number of the COS. For example, the initiator may dial a specific toll-free access number in the format of a 1-800 call. The initiator provides such information as the number and location of the parties to be conferenced, the times for beginning and ending the conference, and the telecommunications facilities requirements, e.g., bandwidth requirements. After receiving the requirements, the COS compares the requirements with information in a database, including the cost of each of the paths/routes at the desired time of the conference, the available network paths/routes for the required bandwidth and quality of transmission, and the capabilities of the terminal equipment available to the participants of the conference call. The COS selects the most cost effective means for initiating the conference and sends the information to the parties involved in the conference. Alternatively, the information required for conference initiation may be provided to a network call controller that sets up the conference, so that no further intervention by the participants is required.

The conference calling system of McFarland et al. provides a number of advantages over prior art systems and methods. By providing a central COS that can be accessed from any switch in a network of switches, a cost-conscious party may provide significant savings to a business that utilizes conference calls on a regular basis, e.g. call centers. However, the system relies upon individuals to contact the centrally located COS, or the benefits of the system cannot be realized. Another concern is that often the benefit of adding a third party to a call session is not realized until after the first two parties have entered into a call session. In this situation, the COS would require the existing call to be terminated and the toll-free call to the COS to be made before the most cost efficient conference call connectivity could be calculated by the system. Additionally, the COS does look to the availability of the network paths/routes, but does not seem to consider whether use of a particular available path/route will render one of the switches susceptible to a blockage condition caused by exhaustion of available telecommunications resources.

What is needed is a method and apparatus that provide an automated mechanism for selecting and establishing "optimal" connectivity of conference call parties based upon at least one preference, e.g., a cost-related preference, with the method and apparatus being executable either before or during a call session. What is also needed is a method and apparatus that provide an automated reconfiguration of conference call connectivity of existing calls when there is a relevant change with respect to the preferences.

SUMMARY OF THE INVENTION

The present invention provides methods and apparatus for establishing bridges among the participants of a conference call. In the preferred embodiment, location information indicative of the location of each of the parties in the conference call is received at a first node. A connection is then established between the first node and at least one other node. The other node(s) have conference-bridging capability. A collaboration is then established between the first node and the other node(s). This collaboration selects which of the nodes will provide a bridge to connect the second and third parties of the conference call session with the first party. The collaboration also includes (1) the exchange of signal messages between the first and other node(s) and (2) access to a database of information which is relevant to the preferences used in selecting between the first and the other node(s). After the collaboration is complete, the parties are bridged into the conference call session. This bridging occurs at the selected node.

DETAILED DESCRIPTION

Figure 1:
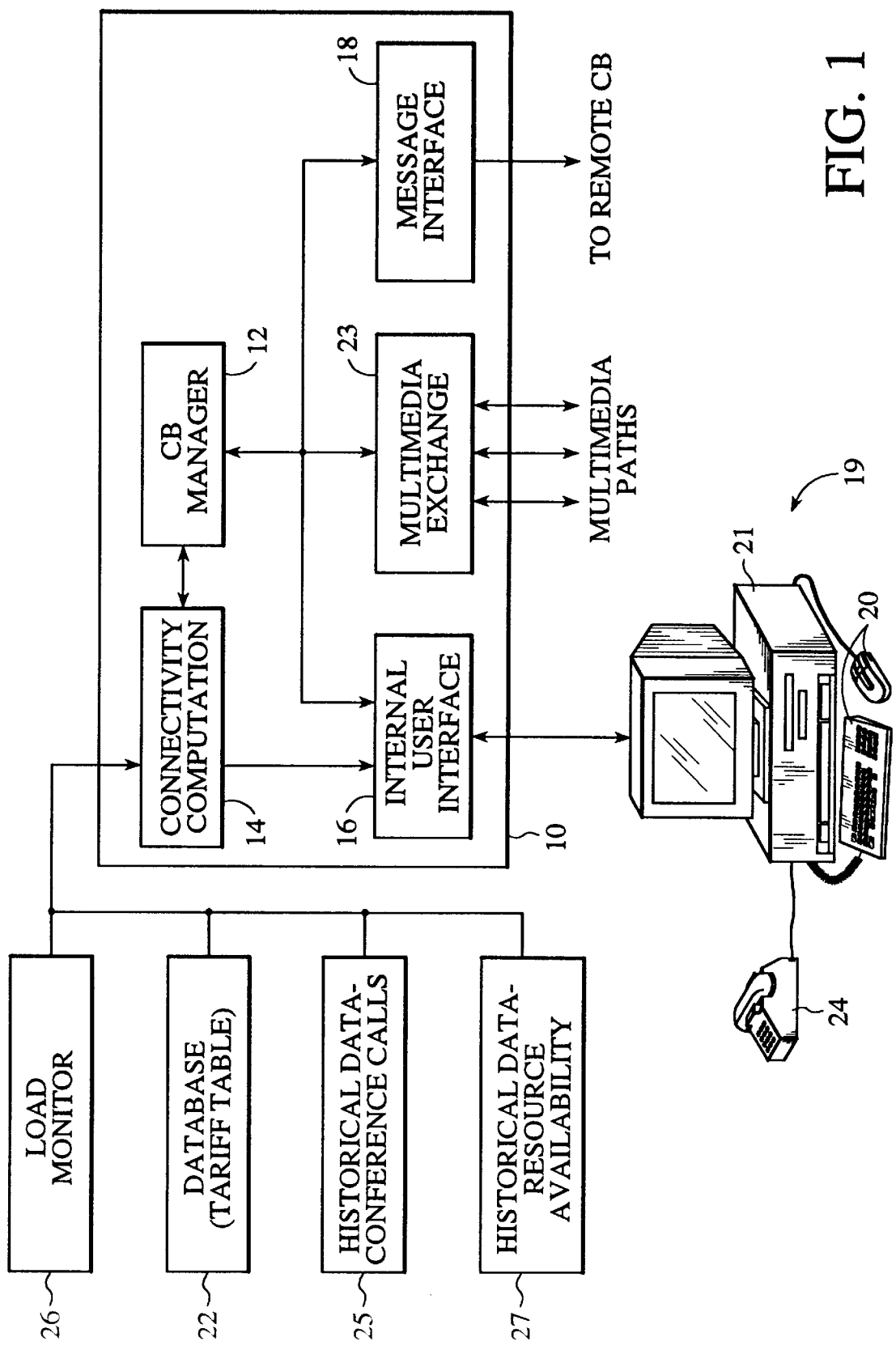
FIG. 1 is a block diagram of a conference bridge and related components for carrying out the invention.

Connectivity for a conference call session is selected and executed by establishing a collaboration between different nodes that each have conference-bridging capability. In the preferred embodiment, the collaboration is between conference bridges of the individual nodes. There may be a number of different times at which the collaboration occurs. First, when a single party initiates a call session that is to include three parties, the conference bridges of two or more nodes may negotiate the initial connectivity based upon selected objectives, e.g. cost savings. In another occurrence, the collaboration is established to determine connectivity when one party calls a second party, who then initiates a call to a third party. In a third occurrence, conference call connectivity is reconfigured upon detection that circumstances related to connectivity preferences have changed, e.g. call rates have raised or lowered as a result of reaching a certain time of day. However, there are cost-related limits to this systematic reconfiguring of conference calls. A fourth occurrence of collaboration is a determination of whether existing connections should be reconfigured when an additional party is added to an ongoing call session. The collaboration may also occur within a two-party call, allowing the direction of the party connection to be reversed when it is determined that the reversal would achieve a desired result, e.g. cost savings.

When a person intends to initiate a conference call or intends to add a third person to an ongoing call session, location information indicative of the party or parties is input to the conference bridge of a local node. The conference bridge includes an internal user interface for communication with a telephone or multi-media user station having an interface mechanism. The combination of the internal user interface and the interface mechanism may provide a voice-response driven input, a menu-selection driven input, or a computer-mouse driven input, but other interfaces are also contemplated. The user interface prompts a calling party to enter the calling number of the party or parties to be added. The location information typically will provide parameters for initiating collaboration among different conference bridges.

The conference bridge of each node includes a conference bridge manager. This manager interacts with the user interface, as well as a connectivity computation component and a message interface component that is used to achieve the communication in the collaboration with remote conference bridges. The connectivity computation component of a conference bridge is used to process data received from one or more local databases and from remote conference bridges to determine the comparative desirability of different connectivity configurations. For example, time optimization may be triggered by tracking the different times during the day at which call-rate changes go into effect at various nodes in a network. Typically, call rates are highest at a local node between the working hours of 8:00 a.m. and 5:00 p.m. As another example, load optimization may be triggered by the peak load times for the local node, so that at the peak times it may be more desirable to add parties via the conference bridge of a remote node. This alleviates the susceptibility of the local node to call blockage due to exhaustion of telecommunications resources, such as trunk lines. The availability of telecommunications resources may be monitored to determine whether certain preselected threshold levels have been reached for the local node. When the availability falls below a preselected threshold, load optimization may take precedence over time optimization and cost optimization.

The connectivity computation component may be divided into three separate elements that are hierarchically executed. The first element determines cost optimization for alternative configurations of connectivity. The second element is load optimization that is the highest element in the hierarchy when telecommunications resource availability falls below the preselected threshold level. The time optimization element that was previously described may be used in selecting a time to initiate a conference call or may be used in a reconfiguration scheme for ongoing conference calls.

At the termination of a conference call, the conference bridges that were employed in establishing the session are able to determine and record the length of the session and whether there were any tariff changes during the course of the session. Preferably, the parties are notified of the relevant information and are advised of any less expensive ways of completing future conference calls. For example, an email message may be transmitted to a party who initiated a conference call session, informing the party that the call could have been conducted less expensively by delaying the start of the call until after a certain time, e.g. 2:00 p.m., that allows the tariff charge to drop at a remote node that is involved in the session.

In the preferred embodiment, the method and apparatus are capable of reconfiguring the conference call connectivity during ongoing call sessions. For example, if at the onset of a conference call it is determined that the conference bridging should be accomplished at the local node, but during the call sessions the conference bridge manager component detects that upon reaching 8:00 a.m. it will be more cost effective to allow the remote node to accomplish the bridging, the conference bridge manager may invoke the message interface component to again provide collaboration with the remote conference bridge to negotiate a reconfiguration of the session. In like manner, the reconfiguration may be triggered by detection that the telecommunications resource availability of the bridging node is below a threshold availability level.

An advantage of the invention is that the use of the method and apparatus does not necessarily require the input of information prior to initiation of a conference call. Conference bridge collaboration can be invoked when two or more parties are already conducting a call session. Moreover, the collaboration is transparent to the parties after the location information has been input by one of the parties. Ideally, the reconfiguration of ongoing conference calls is completely transparent to the calling parties. Yet another advantage is that the selection of the "optimal" configuration or reconfiguration considers a number of different factors, e.g., cost, time, and resource availability.

With reference to FIG. 1, a conference bridge 10 is shown as including a conference bridge manager 12, a connectivity computation component 14, an internal user interface 16, a multimedia exchange component 23, and a message interface 18. The internal user interface 16 is connected to a telephone or multimedia station 19 of a user. The station includes a computer 21, two interface mechanisms 20 and a telephone 24, but not all of the elements are required. The internal user interface and the interface mechanisms cooperate to guide a calling party through the steps necessary to initiate a conference call or to add a party to an existing call session involving two or more persons. The specific interface mechanism is not critical to the invention. Exemplary input schemes include a voice-response driven approach, a menu-selection driven approach, and a computer-mouse driven point-and-click approach. The user of station 19 is prompted to provide location information indicative of the location of parties of the conference call. For example, the user may be prompted to enter the calling numbers of the parties who are to be involved in the conference call. Alternatively, after the first connections are established, any party may add more parties to the conference call.

A conventional conference bridge is a component of a node, such as a private branch exchange (PBX), and is used to mix the audio of several participants in a call session involving three or more persons. The voice/multimedia level that achieves this mixing is represented by component 23 in FIG. 1. More than one line extends from this component in order to permit connections of multiple parties.

The conventional conference bridge will connect several participants when instructed to do so by human intervention. However, the conference bridge 10 of FIG. 1 is used to collaborate with conference bridges of other nodes to select one "optimal" connectivity configuration to the exclusion of other "inferior" connectivity configurations. The selection is based upon one or more factors. The factors include, but are not limited to, costs, times, and resource availabilities. The connectivity computation component 14 has an input from a database 22 of information relevant to the selection process. For example, the database may include a tariff table of call rates to telephone stations of other nodes. Thus, if a multimedia station 19 of the node in which the conference bridge 10 resides is used to call an external station, database 22 is equipped to determine the call rate of the session. The use of tariff tables is well known in the art. The invention includes distributed calling with distributed databases, so that each of a number of conference bridges involved in a collaboration to select among various connectivities is able to contribute tariff information regarding calls originating from the PBX at which the particular conference bridge resides.

A first historical database 25 is connected to topography computation component 14 to store and provide access to information related to conference calls. This information may be used to detect patterns in conference calling by subscribers of a PBX, allowing the conference bridge to advise subscribers as to how such calls can be conducted less expensively. Moreover, where a pattern or routine to conference calls is established, the stored information can be used to predict the length of a conference call at the initiation of the call. The prediction is formed by the conference bridge and is used as one basis for selecting the "optimal" connectivity.

A second historical database 27 may include information related to peak hours of the node at which the conference bridge resides. This allows the connectivity computation component 14 to factor in the possibility that a conference call will begin or extend into a high-demand time for telecommunications resources of the node. Additionally, the connectivity computation component has an input from a load monitor 26 that monitors the availability of telecommunications resources. If the resource availability is below a preselected threshold, the "optimal" connectivity, as determined at component 14, is likely to include bridging at a conference bridge that is remote to the one shown in FIG. 1. Moreover, the connectivity may be dynamic, so that if the load monitor 26 provides information that indicates that resource availability has dropped below the threshold level, the ongoing conference calls may be reconfigured to provide bridging at a remote node, thereby freeing resources of the local node.

Figure 2:
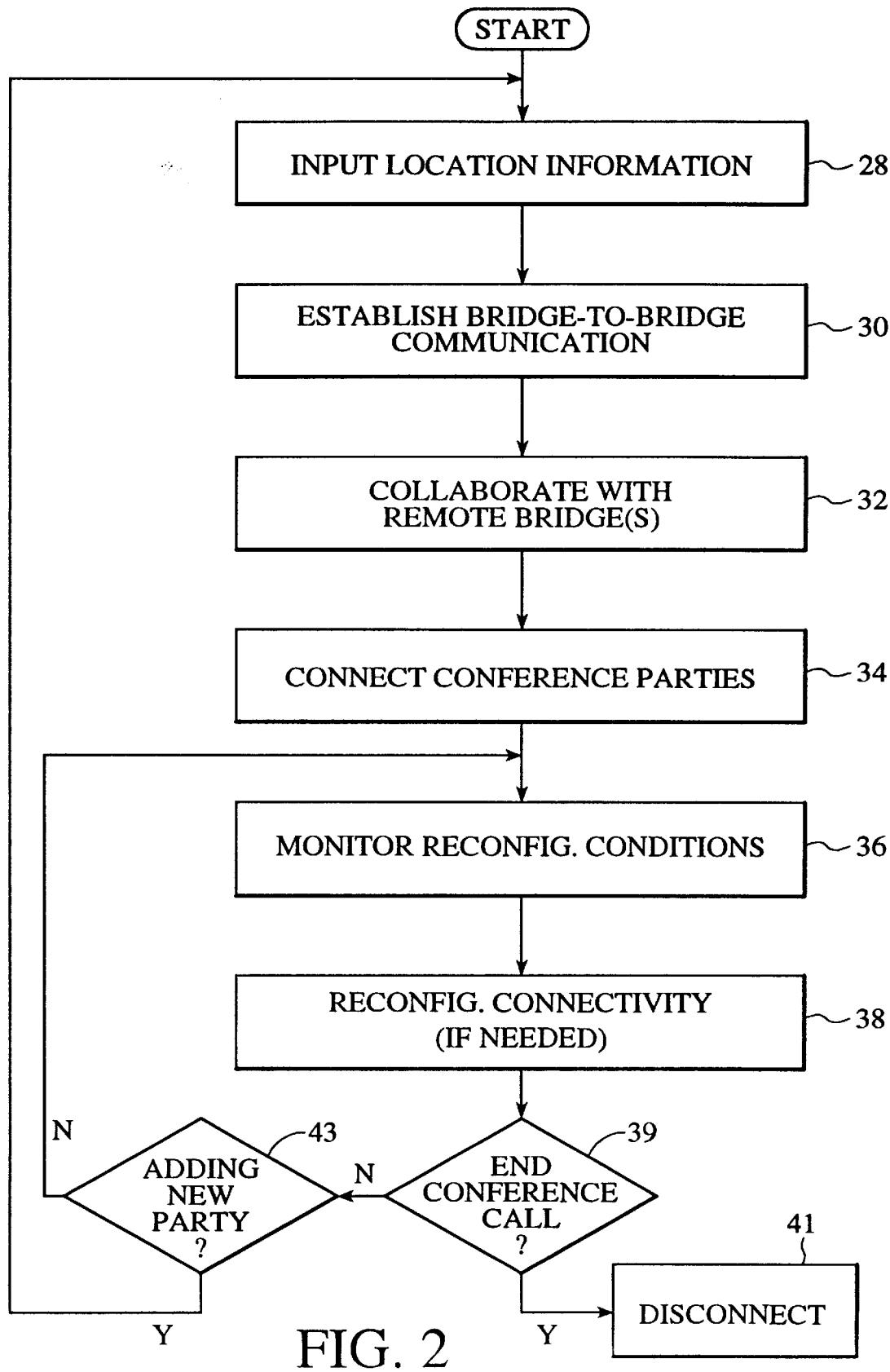
FIG. 2 is a flow chart of steps for achieving collaboration between the conference bridge of FIG. 1 and a remote conference bridge, so that a desired conference call connectivity can be achieved.

Referring now to FIGS. 1 and 2, in a first step 28, the information that identifies the location of one or more parties of a conference call session is input by a user. Unlike prior art automated systems, connections may be introduced in a one-at-a-time fashion, or may be introduced into existing calls. The user employs one or both of the interface mechanism 20 and the telephone 24. For multimedia conference calls, the telephone is only one component of the telecommunications station of the user. The conference bridge manager 12 interacts with the internal user interface 16, the connectivity computation component 14, the message interface component 18, and the multimedia exchange component 23. Based upon the information received from the databases 22, 25 and 27 and from the load monitor 26, the connectivity computation component 14 provides at least an initial determination of the optimal connectivity for the conference call. If the tariff table of the database 22 includes call rates for all of the nodes in the network and database 27 includes information related to high-demand times for all of the nodes in the network, the connectivity computation component of the conference bridge 10 is in a position to unilaterally determine which node should provide the necessary bridging. However, this storage of universal information is not cost-effective in most applications. Therefore, it may be necessary to establish communication with remote conference bridges in order to obtain additional information from the databases of remote nodes for optimizing the connectivity. This communication is established by the manager component 12 invoking the exchange of message signals via the message interface component 18. The step 30 of establishing bridge-to-bridge communication is shown in FIG. 2.

In step 32, if the parties are located at different nodes, the local conference bridge 10 collaborates with one or more remote bridges. Initially, the collaboration may merely be an exchange of information related to call rates and resource availability. The local and remote conference bridges may then renegotiate the connectivity using the message interface components 18 and the bridge manager components 12 of the local and remote nodes. In step 34, the identified parties of the conference call session are connected. At least one of the conference bridges is utilized in this step. For conference calls involving four or more parties, both of the conference bridges may be utilized in establishing the selected connectivity. With respect to connecting the parties, the operation of the conference bridges follows the conventional techniques, and is well understood in the art. Of course, if the parties are all supported by the same PBX, the shared PBX will establish the connection.

In the preferred embodiment, there is a step 36 of monitoring reconfiguration conditions. The conditions for reconfiguring connectivity may be time-dependent. As an example, if call rate changes are automatically implemented at a set time, e.g., 8:00 a.m., the more cost efficient connectivity may switch from providing bridging at the local node to providing bridging at the remote node. This information would be stored in the tariff tables of database 22 in FIG. 1. Thus, at 8:00 a.m., the step 38 of reconfiguring connectivity maybe executed. The reconfiguration switches the assignment of conference bridging from the local node to the remote node. On the other hand, if the resource availability information from the historical database 27 of the remote node indicates that the reconfiguration could create a likelihood of a blockage condition at the remote node, the collaboration between the conference bridges may result in the original configuration being maintained.

Another time-dependent reconfiguration condition that may be monitored at step 36 relates to resource usage cycles. If it is known that the local node typically has a low-demand period from 12:00 p.m. to 1:00 p.m., but this period is followed by a high-demand period, the desirability to reduce the susceptibility of the local node to a blockage condition may override the desire to provide the most cost efficient bridging approach. As a result, the conference call may utilize the cost efficient connectivity of bridging at the local node until 1:00 p.m., whereafter the assignment to provide conference bridging is switched to the remote node at step 38.

In addition to time-dependent reconfiguration conditions monitored at step 36, there may be traffic-dependent conditions. As previously noted, there preferably is a component 26 in FIG. 1 that continuously monitors the utilization of telecommunications resources, such as trunk lines. If it is detected that resource availability has dropped below a set threshold level, dynamic connectivity as provided at step 38 of FIG. 2 allows the conference bridge manager 12 to invoke message exchanges via interface component 18 for the purposes of renegotiating bridging assignment. The reconfiguration may alleviate the demand for the limited telecommunications resources.

If the arrangement of party connections is to be reconfigured, step 39 is a determination of whether the reconfiguration is prompted by termination of the call. When a reconfiguration is merely the termination of the call, the lines are disconnected at step 41. When the reconfiguration is the addition of a new party, as determined at step 43, the process returns to step 28 for the input of location information regarding the new party. However, when the reconfiguration at step 38 is prompted by any other factor (e.g., cost or resource factors) the process returns to step 36 for further monitoring of conditions. Preferably, there are limitations on the frequency of reconfiguration, since each reconfiguration involves a charge.

While the reconfiguration aspect of the invention has been described with reference to reassigning the bridging task from the local conference bridge 10 to a remote conference bridge, the opposite condition operates equally well. That is, if a remote conference bridge detects a condition that dictates connectivity reconfiguration, collaboration and renegotiation will be invoked by the exchange of message signals with the local conference bridge 10 to determine whether the optimal connectivity now requires bridging at the local node.

Figure 3:
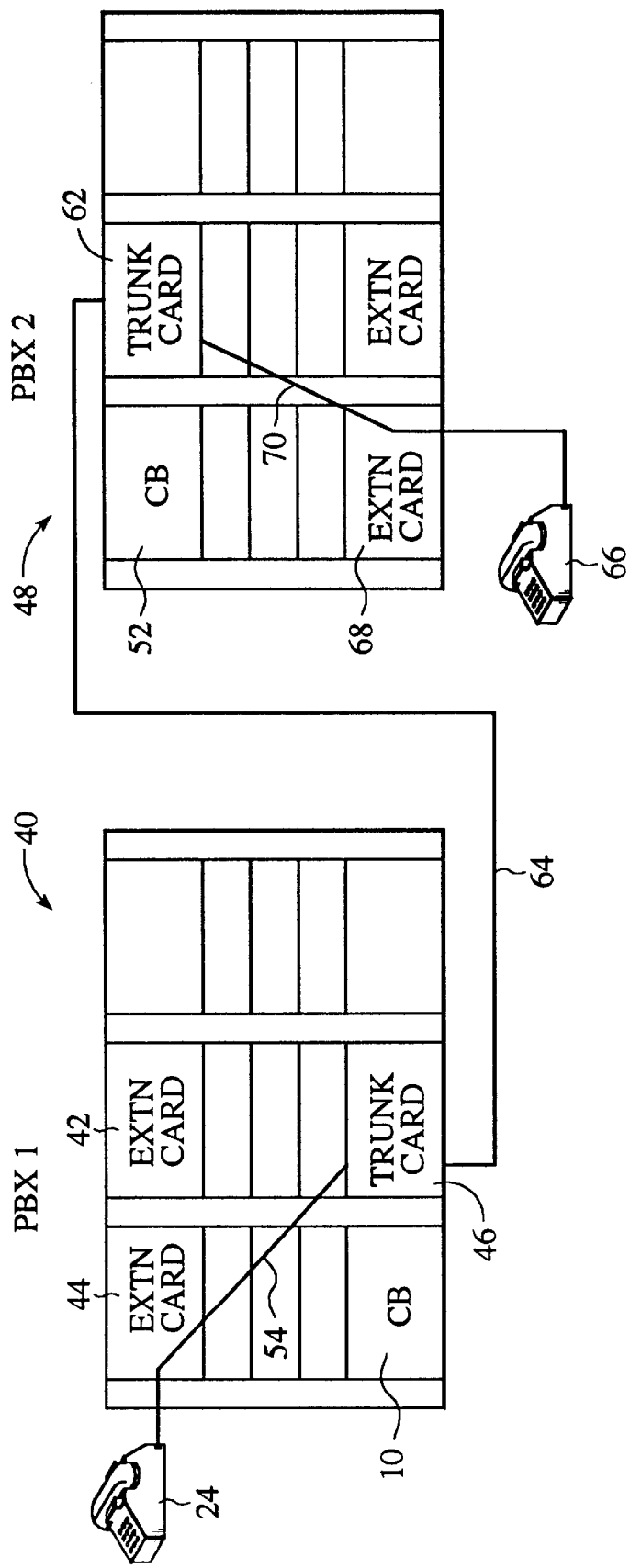
FIG. 3 is a schematical representation of call connectivity negotiated in accordance with the invention.

The operation of the system of FIG. 1 and the process of FIG. 2 will be described with reference to FIGS. 3–5. In FIG. 3, a user at station 24 inputs location information to the local conference bridge 10 using a user interface mechanism, not shown. As previously noted, the station may include a computer and a number of user interface mechanisms, such as a keyboard or a computer mouse. The components of the local node 40 are conventional, other than with respect to those elements of the conference bridge that allow the collaborated connectivity optimization. The local PBX 40 includes extension cards 42 and 44 to support the various extensions of the PBX. In addition, the node includes an external trunk card 46 for outgoing lines to a second PBX 48.

If the user at station 24 of the first PBX 40 initiates a telephone call to a user at station 66 of the second PBX 48, the connection is made via the trunk cards 46 and 62 of the two switches. Internal line 54 connects the extension card 44 of the station 24 to the external trunk card 46. The interconnection between the trunk cards 46 and 62 of the two switches is established by an external trunk line 64. At the second PBX, an internal line 70 connects the trunk card 62 to the extension card 68 that supports the user station 66. After the parties at stations 24 and 66 are connected, the two conference bridges 10 and 52 collaborate to determine whether the direction of the call should be reversed. If a direction reversal is negotiated, the original connection between the parties is maintained while a parallel path of reverse direction is established via the conference bridges. The original connection must be temporarily maintained in order to prevent interruption of the call during the direction reversal. Once the second path is established, the original connection is dropped.

Referring to FIGS. 1 and 3, the multimedia exchange components 23 of the two conference bridges 10 and 52 are not involved in providing the voice path between the two stations 24 and 66, unless a direction reversal has been negotiated between the bridges and the second path has been established. However, the message interface components 18 of the two conference bridges exchange signals that allow the bridges to collaborate in a determination of the direction of the connection. That is, while the initiation of the call by a user at station 24 requires that the initial direction be from the first PBX to the second PBX, the two conference bridges may determine that a reconfiguration to reverse the direction will lead to a cost savings, so that the reversal is then initiated. The exchange of message information and multimedia information between the two bridges can be implemented by merging the message and multimedia data (i.e., in-band signaling) or the two forms of data can be separately transmitted by out-of-band signaling, as is well known in the art. Since the direction does not affect the resource allocation, other than during that reconfiguration time in which parallel paths exist, only the cost is considered in the collaboration between the two conference bridges. Costs are determined using the tariff-related databases 22 of the two switches.

Figure 4:
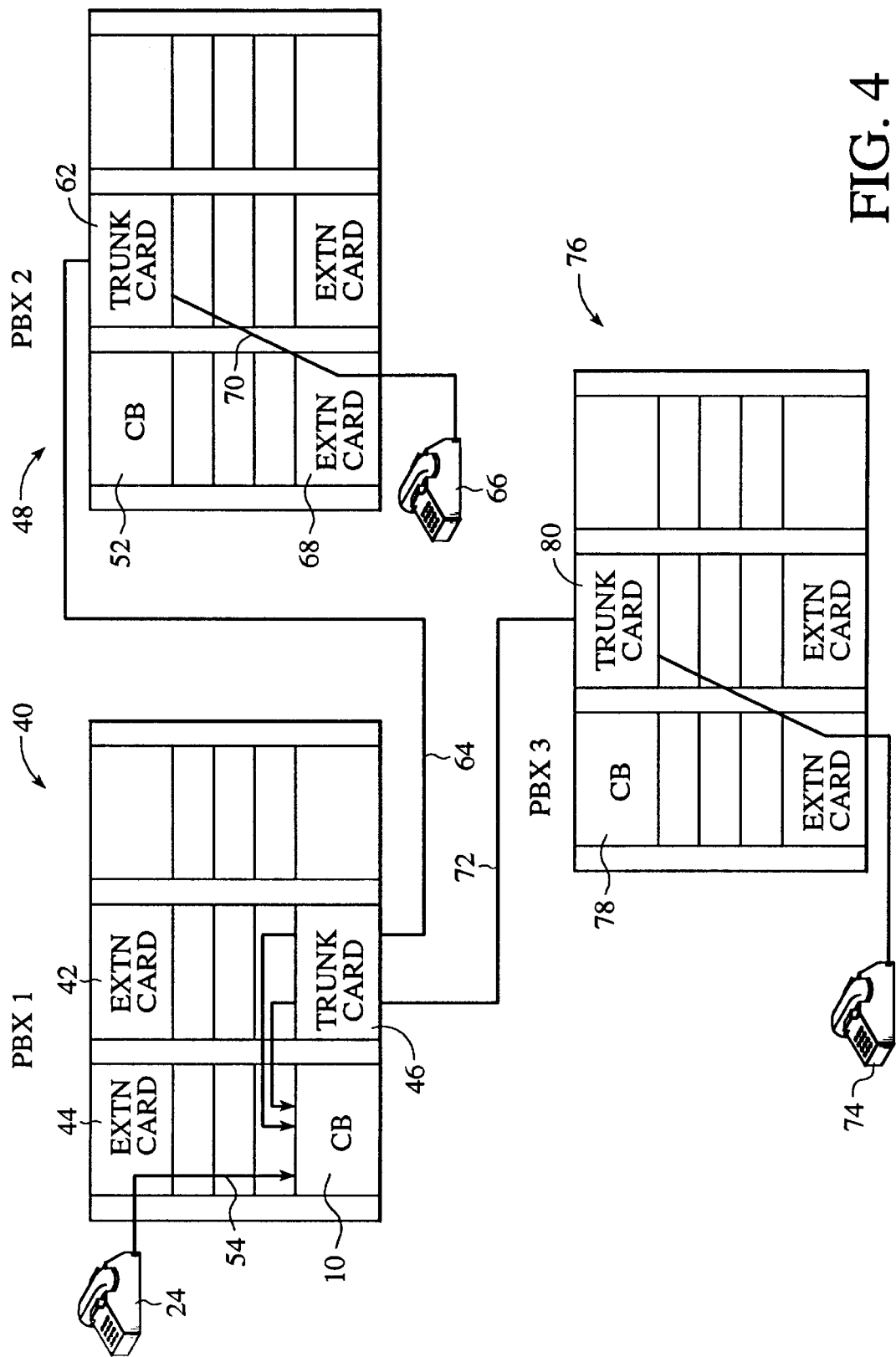
FIG. 4 is a schematic representation of a conference call connectivity negotiated in accordance with the steps of FIG. 2.
Figure 5:
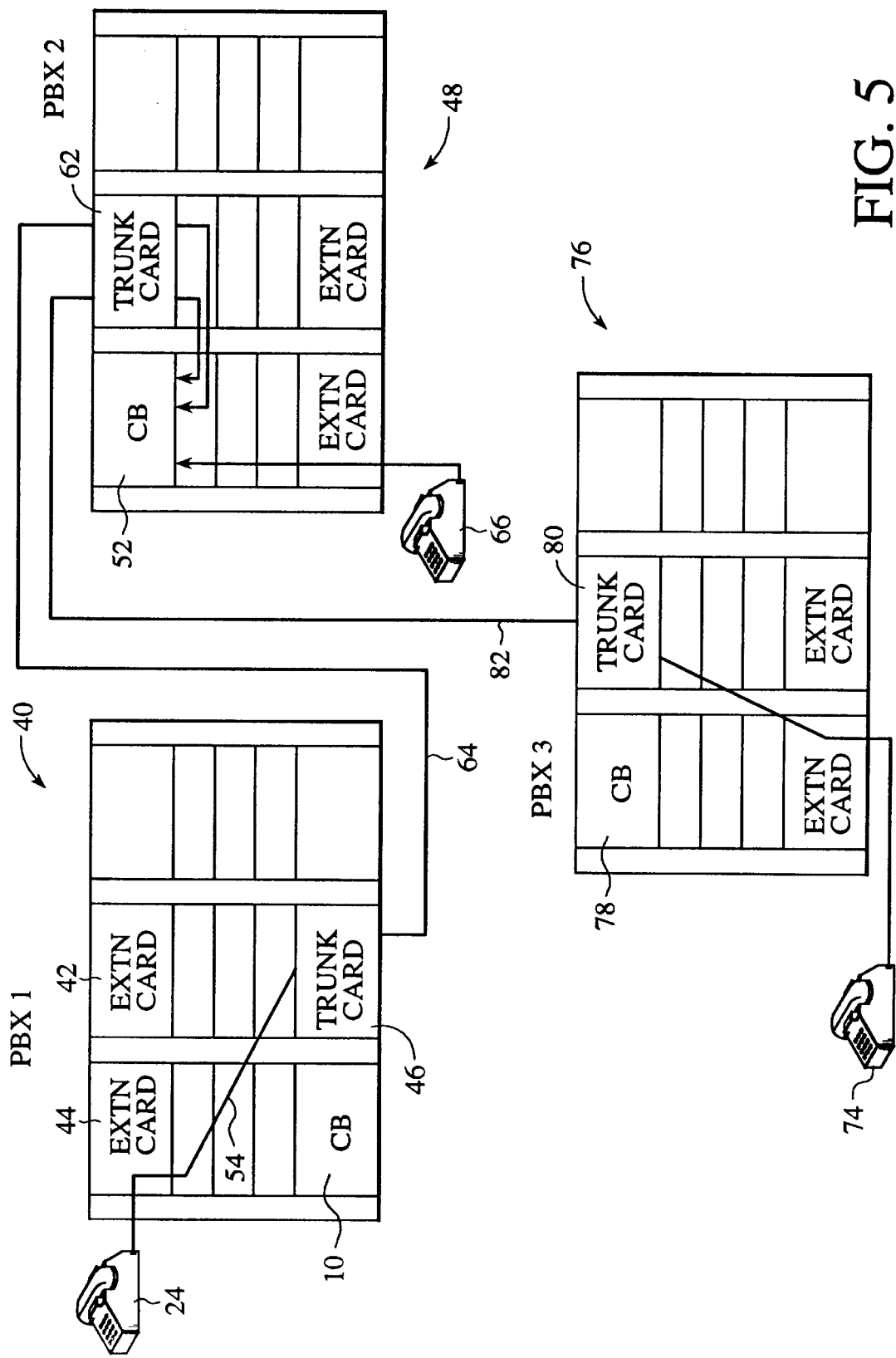
FIG. 5 is a reconfiguration of the connectivity of FIG. 4 as a result of detection of changing circumstances.

Referring now to FIG. 4, if the two parties who are involved in the call from station 24 to station 66 decide to include a third party who is at a station 74 of a third PBX 76, one of the original parties will input the location information relevant to identifying station 74. While the two original parties determine who is to initiate the addition, it is the collaboration between the two conference bridges 10 and 52 that determines which conference bridge is to be used in connecting the three parties. As previously noted with reference to FIG. 1, the three databases 22, 25 and 27 of a PBX include the information relative to the selection of the "optimal" conference bridge. Each PBX 40, 48 and 76 includes the three databases, so that the selection of the connectivity may utilize all three databases of all three PBXs. However, the information of the databases of the third PBX 76 is accessible only after a connection is made to conference bridge 78, so that this information is used in the determination of whether a reconfiguration is appropriate. In FIG. 4, the conference bridge 10 of the first PBX 40 has been selected to provide audio and/or multimedia mixing for the conference call session. A second external line 72 from the trunk card 46 of the first PBX to the trunk card 80 of the third PBX establishes the connection between the first and third switches. Alternatively, different trunk cards of the first PBX may be used to establish the two connections, in a manner well known in the art.

After the connections of FIG. 4 have been established, the three conference bridges 10, 52 and 78 continue to collaborate. Returning to FIG. 1, the load monitor 26 provides an input as to the availability of resources at the conference bridge 10 that provides the connection. In addition, the historical data of resource availability is acquired at the database 27. All three of the PBXs 40, 48 and 76 provide information for ascertaining whether a reconfiguration of connectivity topography will result in a cost savings. If it is determined that the "optimal" connection changes for an ongoing conference call, the topography can be reconfigured, as previously noted with respect to step 38 of FIG. 2. In FIG. 5, the reconfiguration has resulted in the conference bridge 52 of the second PBX 48 acting as the bridge to link the three stations 24, 66 and 74. The reconfiguration adds an external line 82 between the trunk cards 62 and 80 of the second and third PBXs, thereby temporarily establishing parallel paths as previously described with reference to FIG. 3. The original path from the trunk card 46 of the first PBX to the trunk card 80 of the third PBX is then disconnected, leaving the configuration shown in FIG. 5. The reconfiguration that takes place from FIG. 4 to FIG. 5 may be dictated by one of the time-dependent or load-dependent conditions that were described above. That is, the reconfiguration may be for the purpose of freeing telecommunications resources of the local switch, or may be a result of a time-dependent increase in call rates at the local PBX 40 or a time-dependent decrease in the call rates from the remote PBX 48.

We claim:

1. A method of executing a conference call session between parties using at least two nodes having conference-bridging capability, said method comprising steps of:

at a first node, receiving location information indicative of location of each of said parties of said conference call, said first node having a first party of said conference call session as a subscriber;

establishing communication between said first node and at least one second node having conference-bridging capability;

establishing collaboration between said first and second nodes to select which of said first and second nodes is to provide a bridge to connect second and third parties of said conference call session with said first party, including exchanging signal messages between said first and second nodes and including accessing a database of information relevant to preferences in selecting between said first and second nodes; and in response to said collaboration, bridging said parties into said conference call session, with said bridging occurring at said selected node of said first and second nodes.

2. The method of claim 1 wherein said step of establishing collaboration includes providing negotiations between a conference bridge of said first node and a conference bridge of said second node.

3. The method of claim 1 wherein accessing said database of information relevant to preferences in selecting between said first and second nodes includes determining levels of availability of telecommunications resources at said first and second nodes.

4. The method of claim 1 wherein accessing said database includes accessing information indicative of anticipated levels of telecommunications resources availability as based upon times of days.

5. The method of claim 1 wherein said step of establishing collaboration includes accessing information indicative of current levels of availabilities of telecommunication resources of said first and second nodes.

6. The method of claim 1 wherein accessing said database includes accessing tariff tables of rates of providing telecommunications services from each of said first and second nodes to said third party.

7. The method of claim 1 wherein accessing said database includes accessing historical data regarding previous conference calls, including durations of said previous conference calls.

8. The method of claim 7 wherein said step of bridging said parties includes utilizing said historical data in determining a topography for connecting said parties.

9. The method of claim 2 further comprising a step of a conference bridge of at least one of said nodes notifying at least one of said parties of a less expensive approach to said conference call when a less expensive approach is detected.

10. The method of claim 1 further comprising a step of managing said conference call session following said step of bridging said parties into said session, including reconfiguring said session when a predetermined condition regarding at least one of calling costs and resource availabilities is detected.

11. The method of claim 10 wherein reconfiguring said session includes invoking message exchanges between said first and second nodes to reselect which of said first and second nodes is to provide said bridge to connect said third party.

12. The method of claim 10 wherein said step to managing includes monitoring all conference call sessions involving a conference bridge of said first node to determine when said predetermined condition is met.

13. A method of adding a party to an existing call session that utilizes first and second switches that each include a conference bridge, said method comprising steps of:

initiating collaboration between said conference bridges of said first and second switches to select between said first and second switches for connecting said party, including determining which one of said first and second nodes involves a lower call rate in forming a connection to said party, said determination including accessing a tariff table of rates, thereby designating a preferred switch for connecting said party;

determining whether said preferred switch involving said lower call rate has call-connection resource availability that is above a preselected availability threshold level;

at least partially based upon whether said preferred switch has call-connection resource availability above said threshold level, negotiating which of said conference bridges is to form a bridge to said party;

based upon said negotiation, forming said bridge to said party; and monitoring said call session after said party has been connected and selectively reconfiguring connections to parties of said call session based upon at least one of time-dependent rate changes and changes in said call-connection resource availability.

14. The method of claim 13 wherein said step of negotiating is also partially based on a prediction of said call-connection resource availability for a predicted length of said call session.

15. The method of claim 13 further comprising a step of providing party notification of an alternative approach to conference calls when a less expensive approach is detected at the termination of a conference call.

16. The method of claim 13 wherein said collaboration between said conference bridges of said first and second bridges includes exchanging messages between said conference bridges.

17. The method of claim 13 wherein said step that includes designating said preferred switch is a step of selecting a more cost-effective switch for forming said bridge to said party, with said selecting being based upon said tariff table of rates.

18. The method of claim 13 further comprising receiving information indicative of location of said party, with said information being received via a user interface from an original party of said existing call session.

19. The method of claim 13 wherein said step of determining which one of said first and second nodes involves a lower call rate includes computing and comparing call rates for forming said connection to said party via each of said first and second nodes.

20. A method of executing a call session between at least three parties using at least two nodes having conference bridges comprising steps of:

at a first node, receiving location information indicative of the location of each of said at least three parties of said call session, said first node having a first party of said call session as a subscriber;

establishing communication among a plurality of conference bridges, including a conference bridge of said first node, wherein establishing communication includes forming a distributed database of data relevant to selection of a topography of connectivity from alternative topographies for connecting said parties, said distributed database having data indicative of tariffs and node resource availability for nodes at which said plurality of conference bridges reside;

selecting a topography of connectivity based upon said data stored in said distributed database formed by communication among said plurality of conference bridges; and connecting said parties based upon said selected topography.

21. The method of claim 20 wherein said step of selecting a topography is a step of selecting a topography requiring distributed calling in which at least two conference bridges are utilized in said selected topography.

22. A conference bridge of a telecommunications local node comprising:

user interface means for receiving location information from a calling subscriber of said local node, said location information being indicative of location of a party to whom a bridge is to be formed to connect said party within a conference call;

computation means, connected to receive said location information and to receive call rate information, for computing a first call rate of bridging said party from said local node and for comparing said computed first call rate to a second call rate that is indicative of costs of bridging said party from a remote node having a second conference bridge;

message interface means for negotiating with said second conference bridge of said remote node based at least partially upon said first and second call rates; and conference bridge manager means, connected to said computation means and said message interface means, for selecting between said conference bridges of said local and remote nodes to form a bridge to connect said party.

23. The conference bridge of claim 22 wherein said computation means includes an input connected to a database of tariffs for providing telecommunications services.

24. The conference bridge of claim 22 further comprising means for monitoring telecommunications resource availability, said conference bridge manager means being responsive to telecommunications resource availability in selecting said conference bridge.

25. The conference bridge of claim 22 further comprising means for reconfiguring an on-going conference call session in response to detection of a time-dependent change in at least one of said first and second call rates.

26. The conference bridge of claim 22 wherein said conference bridge manager means is a means of initiating reconfiguration of a topography for connecting parties of a conference call based upon predetermined factors, such that said reconfiguring is transparent to said parties.

27. The conference bridge of claim 22 wherein said message interface means is a means of exchanging messages with remote conference bridges utilizing an established message protocol, said messages being different than audio/multimedia information from said parties.

* * * * *